H. G. HULBURD.
MANUFACTURE OF SOLDER WIRE.
No. 185,324. Patented Dec. 12, 1876.
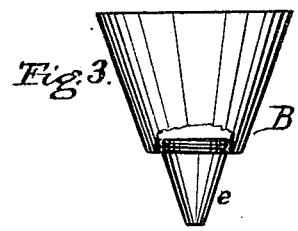
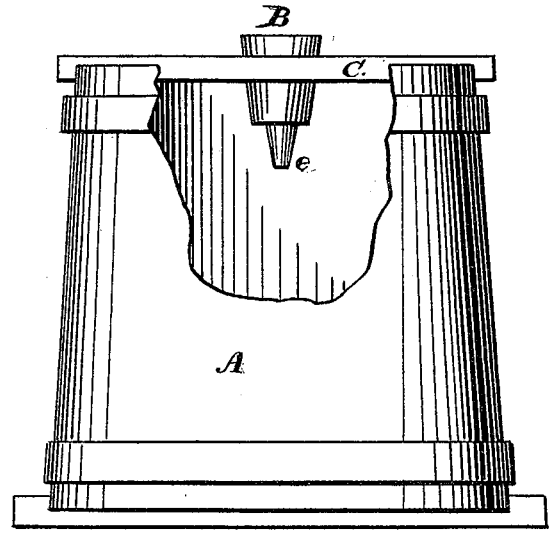
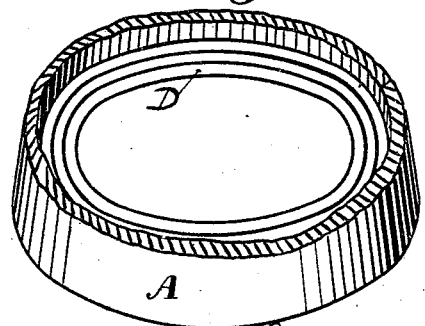

UNITED STATES PATENT OFFICE.

HILAND G. HULBURD, OF PLACERVILLE, CALIFORNIA.

IMPROVEMENT IN THE MANUFACTURE OF SOLDER-WIRE.

Specification forming part of Letters Patent No. 185,324, dated December 12, 1876; application filed April 3, 1876.

*To all whom it may concern:*

Be it known that I, HILAND G. HULBURD, of Placerville, El Dorado county, State of California, have invented Improvements in the Manufacture of Solder-Wire; and I do hereby declare the following description and accompanying drawings are sufficient to enable any person skilled in the art or science to which it most nearly appertains to make and use my said invention or improvement without further invention or experiment.

This invention relates to an improvement in the manufacture of solder-wire for soldering purposes; and it consists in running the melted solder, through a funnel-shaped vessel, into water, where it is cooled and converted into wire, such as is used for soldering purposes; also, in the construction and arrangement of the receiving-vessel, which is arranged to have nozzles of different sizes secured to it for different-sized wire, all as hereinafter more fully set forth and claimed.

Referring by letters to the drawings, A represents a water-tank, varying in capacity according to the quantity of water required for cooling purposes, but, preferably, not less than three feet in diameter, and a trifle over four feet in height. B is a funnel-shaped vessel or kettle, arranged over said tank and secured in position by means of cross-bars C or other support. The discharge end or nozzle c of this vessel is made detachable, so that it may be unscrewed and replaced by a nozzle, leaving an orifice of greater or less area, according to the size of the wire to be manufactured. The tank should be filled with water to within about an inch of the nozzle, it being desirable that only a short space shall intervene between the two.

To manufacture solder-wire according to this invention, the fused or melted solder is poured into the funnel-shaped vessel B, from which it will pass through the nozzle c into the water below in a fine continuous stream. As it is cooled and hardened by the water, it is converted into wire, which coils, D, upon the bottom of the tank, as shown in the drawing. Care should be taken to form the tank of such area that the wire will not come in contact with the sides before being perfectly cool.

What I claim as my invention, and desire to secure by Letters Patent, is—

1. The process of forming solder-wire by running the melted solder through a funnel-shaped vessel into water, substantially as specified.

2. The funnel-shaped vessel B, provided with a removable nozzle, c, and sustained over a water-tank, A, by means of suitable supports, substantially as shown, and for the purpose set forth.

HILAND G. HULBURD.

Witnesses:
  A. P. HALL,
  B. H. HULBURD.